Figure 1:
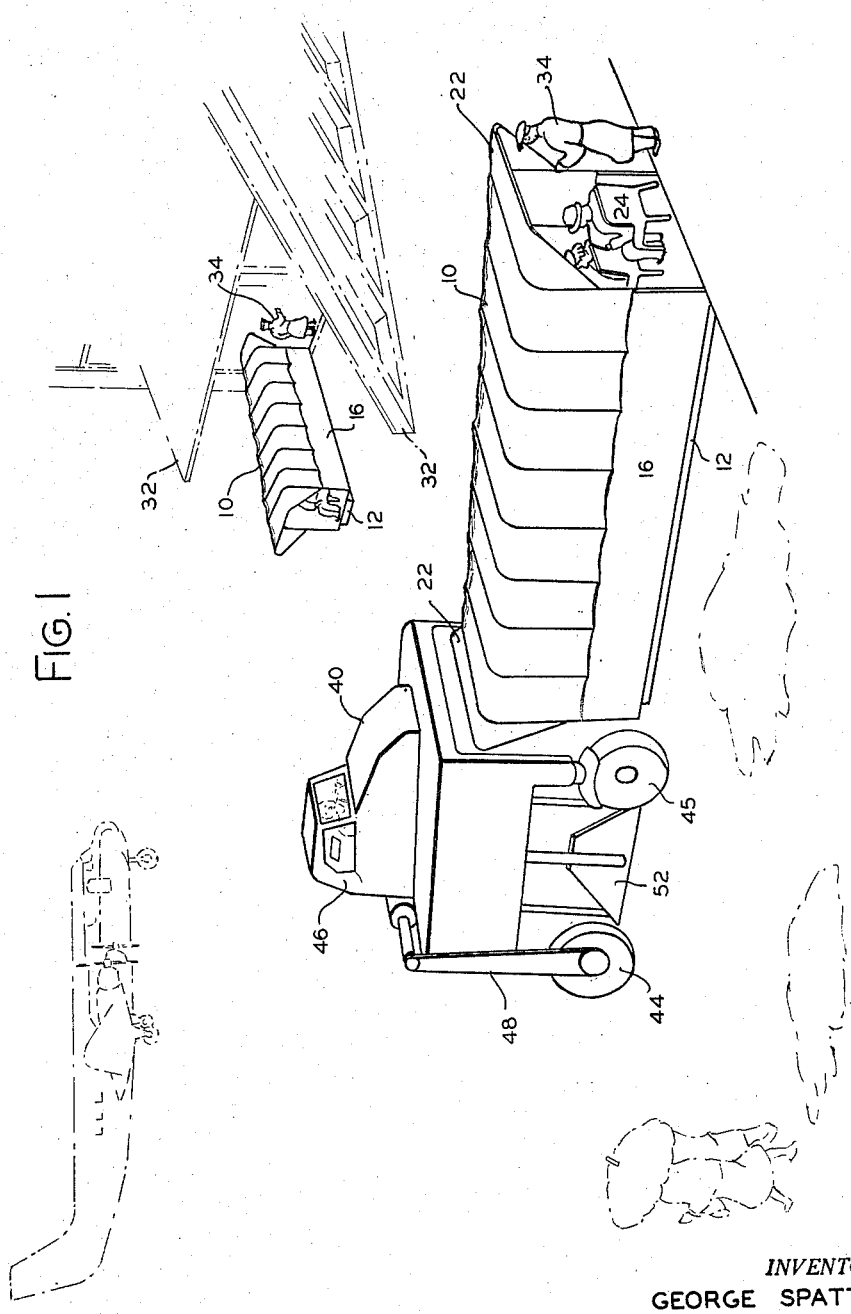

May 5, 1959

G. SPATTA 2,885,242

APPARATUS AND METHOD FOR HANDLING PASSENGERS

Filed Aug. 20, 1954

3 Sheets-Sheet 2

INVENTOR.
GEORGE SPATTA
BY
Kenneth C. Witt
ATTY.

May 5, 1959 G. SPATTA 2,885,242
APPARATUS AND METHOD FOR HANDLING PASSENGERS
Filed Aug. 20, 1954 3 Sheets-Sheet 3
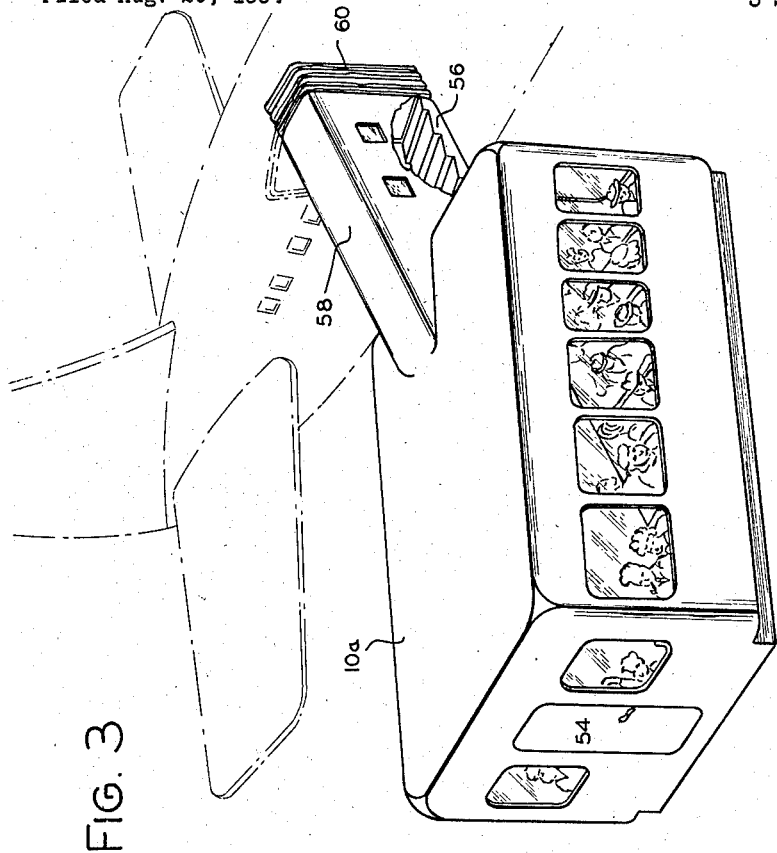
Fig. 3
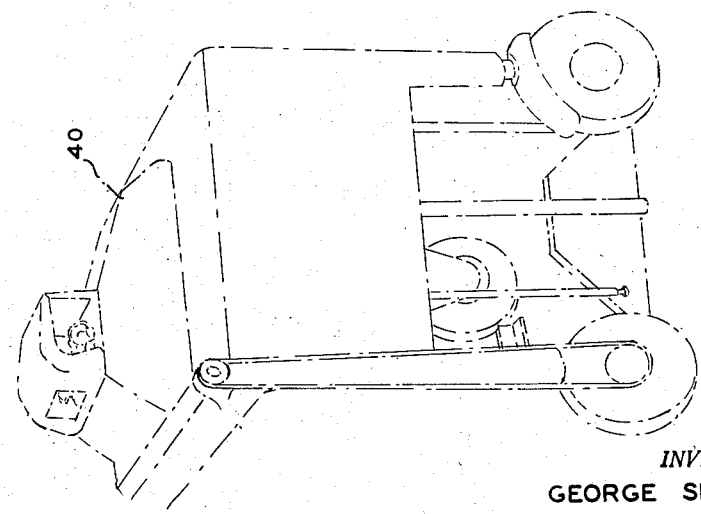
INVENTOR.
GEORGE SPATTA
BY
ATTY.

2,885,242

APPARATUS AND METHOD FOR HANDLING PASSENGERS

George Spatta, Buchanan, Mich., assignor to Clark Equipment Company, a Michigan corporation Application August 20, 1954, Serial No. 451,220

1 Claim. (Cl. 296—28)

This invention relates to apparatus and methods for handling passengers. The invention is particularly suited for handling aircraft passengers although it should be understood that it is not limited to the handling of aircraft passengers.

The handling of passengers such as those embarking on and debarking from airplanes presents enormous problems. Moreover, these problems daily are increasing in complexity because of the increasing number of passengers.

Taking the handling of aircraft passengers as an example, one of the major problems is the locating of an airplane close enough to the terminal to permit the unloading and loading of passengers on the airplane without an undue amount of travel between the terminal and the airplane. This problem has been solved up to now mainly by extending the terminal building, or covered runways from the terminal building, in various ways so as to be able to park the airplanes adjacent such a runway or extension of the terminal building. This, however, has created long walks for the aircraft passengers and furthermore has complicated greatly the maneuvering of airplanes on the ground.

Another problem in the handling of aircraft passengers is the long delays which are frequently encountered by waiting passengers after a plane has arrived, while the plane is being refueled, cleaned or other operations performed on it. It is necessary for reasons of safety and efficiency that the passengers be kept within the terminal building or behind some sort of barrier away from the airplane while it is being serviced. This produces inconvenience for the passengers and also increases the difficulties of the airlines in properly handling such passengers.

Another undesirable feature of the present handling of airplane passengers is that it is almost always necessary for the passengers to go out into the elements in order to go to or from an airplane. This, of course, is very undesirable under adverse weather conditions. Also, it is necessary in almost all cases for the passengers to go up or down a stair which is external to the plane in order to enter or leave it.

The object of my invention is to provide an apparatus and method for handling passengers which eliminates these undesirable features.

A further object is to provide a safe apparatus and method for handling aircraft and other passengers more quickly, more efficiently, and at less expense.

In carrying out my invention in one form, I provide a portable carrier for the passengers which may have a fixed or movable stairway forming a portion thereof. The portable carrier is loaded with passengers at the terminal, after which it is picked up by a self-propelled vehicle and transported to the airplane. There, the passengers go directly from the portable carrier into the airplane.

Figure 2:
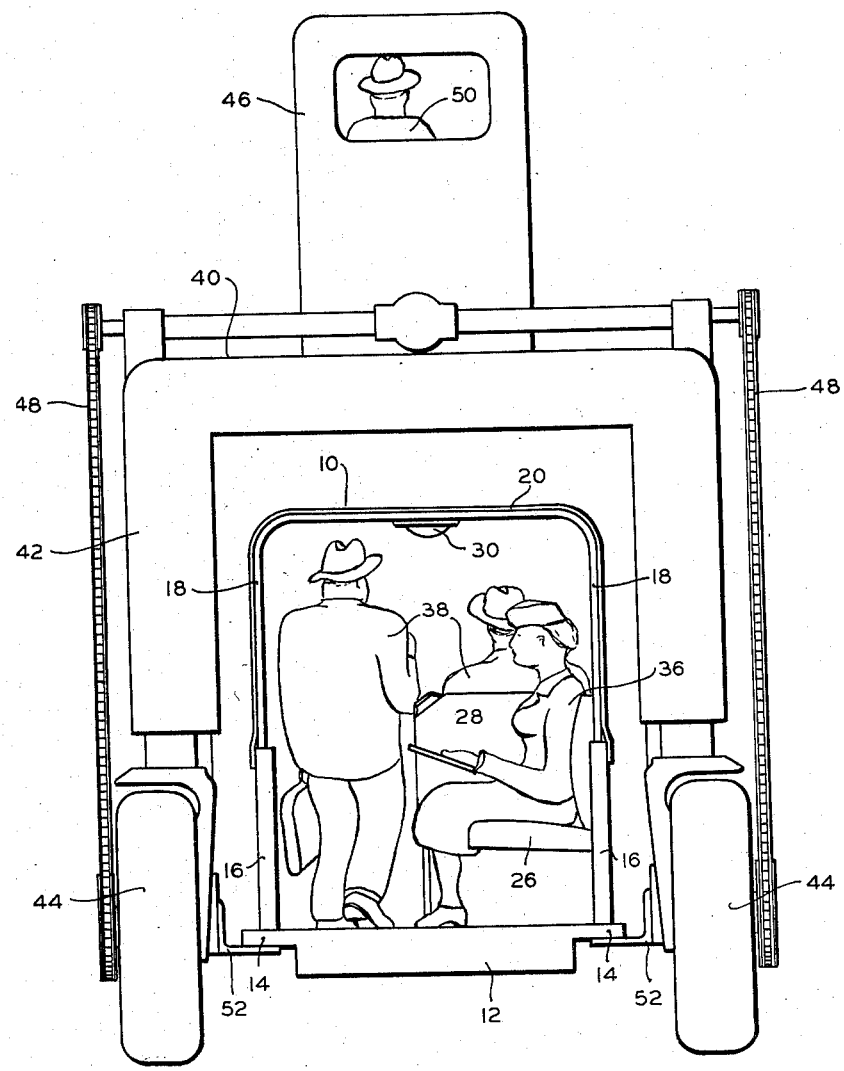

For a clearer and more complete understanding of my invention reference should be had to the accompanying drawing in which Figure 1 is a perspective view showing two of the passenger carriers of my invention, and a gantry truck such as might be used to transport the passenger carriers, in a typical setting, Figure 2 shows an end elevational view of one end of a passenger carrier the same as those in Fig. 1 after it has been picked up by the gantry truck for transport to another location, and Figure 3 is a perspective view of another form of passenger carrier in accordance with this invention shown in an airport setting.

In Fig. 1 of the drawing, the numerals 10 designate passenger carriers in accordance with my invention, one in the foreground and one in the background of this view. These passenger carriers are of relatively light weight and inexpensive construction. Each of these carriers, and the carrier shown in Fig. 2, includes a floor portion 12, and as shown best in Fig. 2 the floor portion has outwardly projecting portions 14 on two opposite sides for a purpose which is discussed in detail hereinafter.

Each of these carriers 10 also includes portions 16 which may be of wood, metal, or other suitable material, extending lengthwise of the carrier and forming a portion of the respective sides of the carrier as illustrated. Rib portions 18 of inverted U-shape are mounted on top of side portions 16, and these rib portions are covered with canvas 20 or other suitable material. Preferably, the top portion of the carrier is provided with extensions 22 at either end to aid in protecting the occupants from the elements.

The carrier 10 may be provided with seats of various types as illustrated at 24 in Fig. 1 and 26 and 28 in Fig. 2. They may be provided also with other facilities such as overhead lights indicated at 30 in Fig. 2. It will be understood that a suitable battery or other means may be incorporated in the passenger carrier to provide power for these facilities.

As illustrated in Fig. 1 of the drawing, these passenger carriers may be placed at suitable locations at an airport or other installation where passengers are handled. As shown, the carriers are located under overhead projecting roofs 32 which make it possible for the passengers to enter the passenger carrier without at any time being without overhead shelter.

As the passengers enter the passenger carrier they may be checked by a doorman as illustrated at 34 in front of each of the carriers in Fig. 1, or they may be checked by a stewardess as illustrated at 36 in Fig. 2 seated immediately inside the entrance to the passenger carrier. The doorman or stewardess ordinarily takes the passengers' tickets, obtains their names, and performs other necessary operations. In addition, it is possible, if desired, to number the seats in the passenger carrier to correspond with those in the aircraft or other conveyance to which the passengers are to be transported so that the passengers can have their seats assigned in advance. Later, after the passenger carrier has been transported to an aircraft or other means of conveyance in a manner described hereinafter, the passengers can proceed immediately to their assigned seats in the aircraft.

An advantage of my method and apparatus is that the operations discussed in the preceding paragraph can be performed while the airplane is being refueled or otherwise prepared for departure. Moreover, it is possible in many cases to perform these operations before the airplane has arrived so that the passengers are ready to be transferred to the airplane without delay immediately upon its arrival.

After the passengers have been loaded into the passenger carrier 10, it is picked up by a suitable self-propelled vehicle and transported to the airplane or other conveyance. As illustrated in the drawing, the vehicle which transports the passenger carrier is a straddle carrier or gantry truck of a type which has been used for many years in the handling of materials such as lumber, steel shapes and the like. However, it will be understood that my invention is not limited to the use of this type of vehicle and that other types of vehicles may be employed for transporting the passenger carrier if desired.

In the drawing, a stradled carrier 40 is shown for handling the passenger carriers 10. The straddle carrier 40 includes a gantry frame 42 which is arranged to straddle the passenger carrier, the frame 42 being mounted on four wheels in the conventional manner. In the drawing the rear wheels are designated by the numeral 44 while the front wheels, only one of which appears in the drawing, are labeled 45. Ordinarily the two rear wheels are drive wheels while all four wheels are dirigible, and the machine illustrated is arranged in this manner. However, there may be four drive wheels and/or two dirigible wheels in some cases, if desired. The operator of the straddle carrier is located in a suitable compartment 46 on top of the machine. The engine or other propelling means likewise may be located in this compartment, along with hydraulic pumps and other accessories needed for the operation of machine 40. Linkage means (not shown) are provided for connecting a steering wheel in the operator's compartment 46 with the dirigible wheels 44 and 45 for steering the vehicle 40. Chain drive means indicated schematically at 48, or other equivalent means, are provided for connecting the engine of the vehicle to the drive wheels 44.

Under control of an operator 50 in the compartment 46 the straddle carrier 40 may be driven over the passenger carrier 10. In Fig. 1 of the drawing the straddle carrier is approaching the passenger carrier 10 in the foreground, while in Fig. 2 of the drawing the straddle carrier has straddled the passenger carrier and has picked it up for transport to another location. The straddle carrier picks up the passenger carrier by means of a pair of swing hooks 52. These hooks may be controlled by the operator of the straddle carrier in a known manner to move the hooks under the projections 14 of the floor 12. Then, after they have moved under the projections 14 the hooks are raised whereby the passenger carrier is picked up off of the ground or other supporting surface.

After picking up the passenger carrier, the vehicle 40 transports the passenger carrier and the passengers therein to the airplane and sets the passenger carrier down again adjacent the plane. The passengers then leave the passenger carrier 10 and walk up the usual stair to enter the plane. The stair may be covered, of course, if desired so that the passengers are always under shelter from the time when they leave the terminal until they are in the airplane.

In Fig. 3 of the drawing I have shown another passenger carrier in accordance with my invention which I have designated 10a in order to distinguish it from the carriers shown in Figs. 1 and 2. The carrier 10a includes a floor portion the same as a passenger carrier 10 with projections along two opposite sides which enable it to be picked up by a gantry truck or other vehicle the same as the passenger carriers in the other figures.

Passenger carrier 10a is completely enclosed and includes a door 54 at one end and a covered stair 56 projecting from the other end. The carrier 10a is provided with seats for the passengers in a similar manner to carrier 10, and may be provided also with lights, heat, air conditioning, and other facilities if desired.

Passenger carrier 10a is used in the same manner as passenger carrier 10 except that the built-in stair 56 is utilized to enable the passengers to enter the plane directly from the passenger carrier. The passenger carrier 10a is located adjacent the plane by a gantry truck or other vehicle in a manner such that the projecting stair 56 and its enclosure 58 have their terminal portions closely adjacent to the door opening of the plane.

If desired, suitable sealing means may be provided at 60 to seal the opening between the enclosed stair and the plane. The passengers go from the passenger carrier 10a up the stair 56 and directly into the airplane.

It will be understood that the stair 56 can be a moving stair if desired. A known construction may be used for such a moving stair.

By the use of the method and apparatus disclosed herein the handling of passengers may be facilitated greatly with a reduction in the terminal facilities required. In fact, it is possible to eliminate the terminal entirely in certain instances where a relatively small amount of traffic is handled, for the passenger carrier itself can serve as the terminal. The carrier illustrated at 10a is particularly suitable for this type of operation. Where only a few passengers are handled, all of the operations necessary to take care of the passengers can be performed in the passenger carrier, and then when the plane or other conveyance arrives, the passengers can be transported to the plane in the same passenger carrier.

At larger terminals, the terminal facilities can be greatly reduced. If passenger carriers of the type disclosed herein are used, less space is needed as waiting rooms for the passengers because they can wait in the passenger carriers. Furthermore, it is not necessary to extend the terminal facilities long distances out adjacent the area where the planes are parked because the passenger carriers may be transported any reasonable distance in a very short time. For example, straddle carriers of the type illustrated at 40 in the drawing frequently operate at speeds of 30 miles per hour and higher. Therefore, even if the planes were parked half a mile from the terminal, it would take only one minute to transport the passenger carrier from the terminal to the plane.

Handling passengers by the apparatus and method disclosed herein benefits both the passengers and the transportation company. Many of the delays now inherent in the handling of passengers are avoided by this method and apparatus. The passengers need not wait in long lines while the plane is being serviced. Instead they can go immediately to a comfortable passenger carrier where their tickets can be taken and other credentials checked while the plane is being serviced.

The operator, on the other hand, can park the airplane or other conveyance at a convenient location somewhat remote from the terminal to perform refueling and other operations on it. Moreover, it is possible in many cases to avoid a great deal of the time which airplanes now spend in taxiing on the ground. If it is not necessary to service the plane during a particular stop, the passenger carrier can be transported out on the field to meet the plane at a relatively distant point, making it unnecessary for the plane to taxi in to the terminal at all.

This invention promotes safety because it provides for the handling of passengers in an orderly manner. It keeps the passengers at a safe distance from the aircraft before boarding and removes them to a safe location in a minimum of time after the aircraft has landed.

Another advantage of this method and apparatus is that one gantry truck or other vehicle may be used to handle several passenger carriers. The gantry truck is needed only for the actual conveying operation on a passenger carrier. While a passenger carrier is being loaded or unloaded the gantry truck can be handling other assignments. Moreover, the same gantry truck which handles passenger carriers can be used for handling baggage, gasoline tanks and many other things, thus keeping to a minimum the investment required in connection with the operation of a terminal.

While I have illustrated and described certain preferred embodiments of my invention, it will be understood that I do not intend to be limited thereto. I intend to cover hereby all modifications which fall within the true spirit and scope of my invention.

What I claim as new and desire to secure by Letters Patent of the United States is:

Apparatus for handling passengers comprising a mobile straddle carrier or gantry type truck, and a portable carrier for passengers which includes a floor portion for supporting the passengers, means at least partially enclosing the space above the floor for the passengers and means by which the portable carrier may be picked up and transported, said straddle carrier being adapted to straddle said portable passenger carrier longitudinally thereof, engage said pick up means and lift said portable carrier in order to transport same from one location to another and said straddle carrier being detachable from said portable passenger carrier by lowering the latter to the lever of the supporting surface of the straddle carrier and moving out of straddling relation thereto, said passenger carrier also including an enclosure extending upwardly and outwardly from one end thereof and a stairway secured to the lower portion of the enclosure thereby permitting passengers to disembark from the passenger carrier at a position elevated from the floor portion thereof.

References Cited in the file of this patent
UNITED STATES PATENTS

| | | |
|---|---|---|
| D. 146,202 | Varrieur et al. | Jan. 7, 1947 |
| D. 146,560 | Dimick | Apr. 8, 1947 |
| 2,379,094 | Maxon | June 26, 1945 |
| 2,410,965 | Dimick | Nov. 12, 1946 |
| 2,462,096 | Hamilton | Feb. 22, 1949 |
| 2,744,581 | Cooper | May 8, 1956 |
| 2,778,674 | Attendu | Jan. 22, 1957 |

FOREIGN PATENTS

| | | |
|---|---|---|
| 164,538 | Australia | June 18, 1953 |